United States Patent
Waldhoer et al.

(10) Patent No.: US 11,992,904 B1
(45) Date of Patent: May 28, 2024

(54) SHORT-CIRCUIT WELDING METHOD AND WELDING DEVICE

(71) Applicant: FRONIUS INTERNATIONAL GMBH, Pettenbach (AT)

(72) Inventors: Andreas Waldhoer, Pettenbach (AT); Dominik Soellinger, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 0 days.

(21) Appl. No.: 18/283,566

(22) PCT Filed: Jul. 12, 2022

(86) PCT No.: PCT/EP2022/069377
§ 371 (c)(1),
(2) Date: Sep. 22, 2023

(87) PCT Pub. No.: WO2023/285416
PCT Pub. Date: Jan. 19, 2023

(30) Foreign Application Priority Data

Jul. 13, 2021 (EP) ..................................... 21185397

(51) Int. Cl.
*B23K 9/073* (2006.01)
*B23K 9/095* (2006.01)

(52) U.S. Cl.
CPC ............ *B23K 9/073* (2013.01); *B23K 9/0953* (2013.01)

(58) Field of Classification Search
CPC ...... B23K 9/073; B23K 9/0953; B23K 9/095; B23K 9/09; B23K 9/12
See application file for complete search history.

(56) References Cited

U.S. PATENT DOCUMENTS

| | | |
|---|---|---|
| 8,841,581 B2 | 9/2014 | Kawamoto et al. |
| 9,012,808 B2 | 4/2015 | Artelsmaier et al. |

(Continued)

FOREIGN PATENT DOCUMENTS

| | | |
|---|---|---|
| CN | 101128279 A | 2/2008 |
| CN | 102149501 A | 8/2011 |

(Continued)

OTHER PUBLICATIONS

International Search Report in PCT/EP2022/069377, mailed Oct. 27, 2022.

(Continued)

*Primary Examiner* — Brian W Jennison
(74) *Attorney, Agent, or Firm* — Collard & Roe, P.C.

(57) ABSTRACT

A welding device and a short-circuit welding method uses successive welding cycles having respective arc and short-circuit phases. The method includes: conveying a welding wire from a workpiece, bringing the wire to a final rearward speed in a first rearward conveying phase and then conveying it at that speed until a second rearward conveying phase where the rearward speed is reduced; and conveying the wire toward the workpiece, the welding wire being brought to a final forward speed in a first forward conveying phase and being conveyed at that speed until the beginning of a second forward conveying phase where the forward speed is reduced. The first duration is adapted using a feedforward control and/or feedback control such that the welding wire does not exceed a specified reduced rearward speed in the second rearward conveying phase at the point in time at which the short-circuit is interrupted.

14 Claims, 7 Drawing Sheets

(56) References Cited

U.S. PATENT DOCUMENTS

Figure 1:
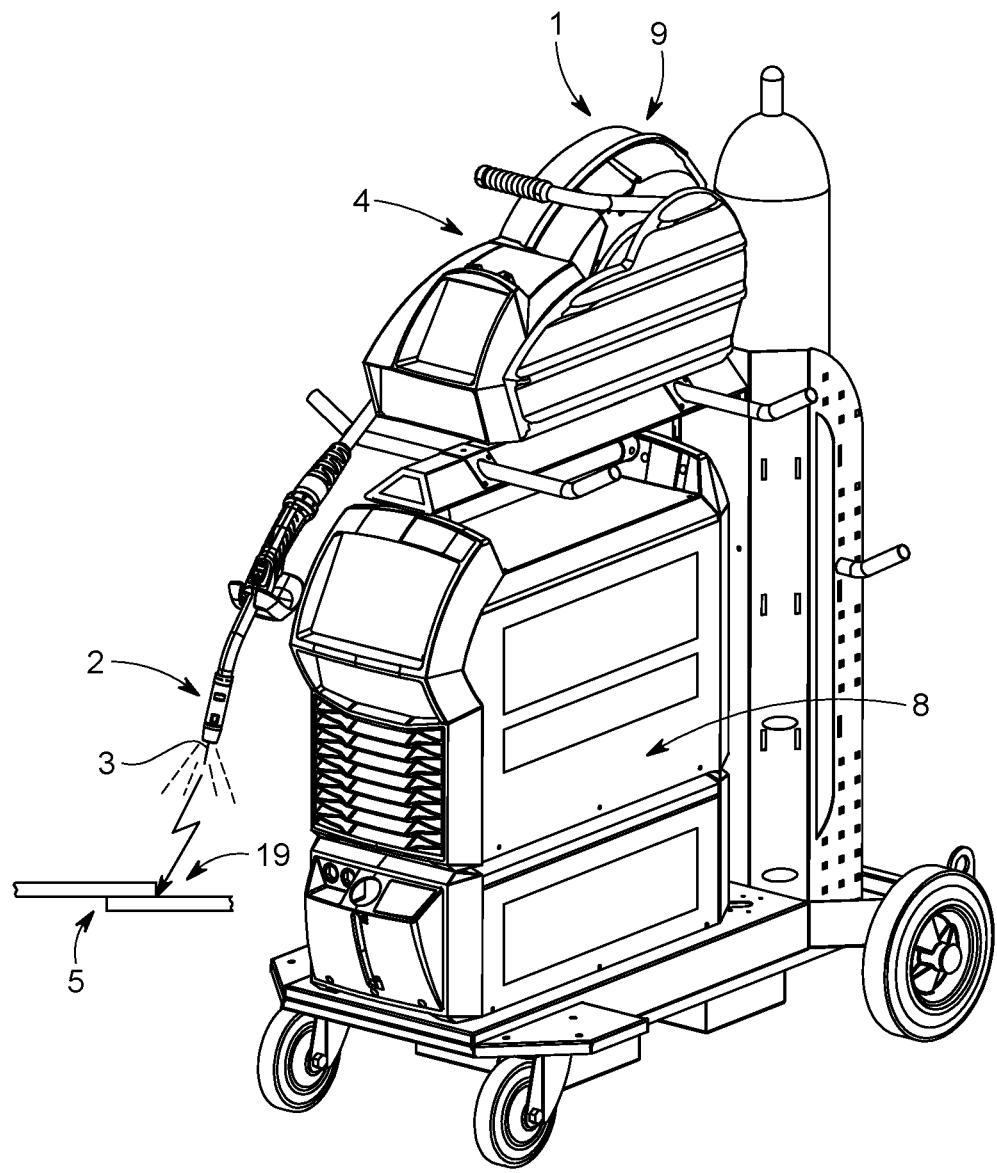

| | | | |
|---|---|---|---|
| 10,661,371 B2 | 5/2020 | Waldhoer et al. | |
| 11,491,570 B2 | 11/2022 | Takada et al. | |
| 11,691,212 B2 | 7/2023 | Ide | |
| 2013/0299475 A1 | 11/2013 | Fujiwara et al. | |
| 2018/0264576 A1* | 9/2018 | Ide ...................... | B23K 9/1006 |
| 2021/0031293 A1 | 2/2021 | Furuyama et al. | |
| 2021/0237191 A1 | 8/2021 | Soellinger et al. | |
| 2022/0410300 A1 | 12/2022 | Waldhoer et al. | |

FOREIGN PATENT DOCUMENTS

| | | | | |
|---|---|---|---|---|
| CN | 103260807 A | | 8/2013 | |
| CN | 108025383 A | | 5/2018 | |
| CN | 109641298 A | | 4/2019 | |
| CN | 111558760 A | | 8/2020 | |
| CN | 111989182 A | | 11/2020 | |
| CN | 112423926 A | | 2/2021 | |
| EP | 3 292 936 A1 | | 3/2018 | |
| EP | 3 815 828 A1 | | 5/2021 | |
| JP | 2021-079427 A | | 5/2021 | |
| JP | 2021079427 | * | 5/2021 | ............... B23K 9/12 |

OTHER PUBLICATIONS

European Search Report dated Jan. 26, 2022 in European Application No. 21185397.3, with English translation of the relevant parts.
Chinese Office Action in Chinese Application No. 202280035234.2 dated Feb. 28, 2024 with English translation.

* cited by examiner

SHORT-CIRCUIT WELDING METHOD AND WELDING DEVICE

CROSS REFERENCE TO RELATED APPLICATIONS

This application is the National Stage of PCT/EP2022/069377 filed on Jul. 12, 2022, which claims priority under 35 U.S.C. § 119 of European Application No. 21185397.3 filed on Jul. 13, 2021, the disclosure of which is incorporated by reference. The international application under PCT article 21(2) was not published in English.

The invention relates to a short-circuit welding method with successive welding cycles, each of which having an arc phase and a short-circuit phase, with the following steps during a welding cycle:

conveying a melting welding wire away from a workpiece during the short-circuit phase at a rearward speed so that material is discharged from the welding wire to the workpiece and an arc is ignited, wherein the welding wire is brought to a final rearward speed during the short-circuit phase in a first rearward conveying phase with a first duration and is conveyed therewith until the beginning of a second rearward conveying phase in which the rearward speed of the welding wire is reduced again, wherein the second rearward conveying phase immediately follows the end of the first rearward conveying phase; and conveying the welding wire in the direction of the workpiece during the arc phase at a forward speed in order to bring the welding wire into contact with the workpiece and to generate a short-circuit between the welding wire and the workpiece, wherein the welding wire is brought to a final forward speed during the arc phase in a first forward conveying phase with a second duration and is conveyed therewith until the beginning of a second forward conveying phase, in which the forward speed of the welding wire is reduced again, wherein the second forward conveying phase immediately follows the end of the first forward conveying phase.

Further, the invention relates to a welding device for performing an above-mentioned short-circuit welding method having successive welding cycles, each having an arc phase and a short-circuit phase, wherein the welding device comprises a welding torch.

Short-circuit welding methods of the type described above include, in particular, so-called CMT (cold metal transfer) welding methods. In a CMT welding method, in order to produce a weld seam or coating, a welding wire of melting material to which a welding current is applied is moved alternately in the direction of the workpiece and away from it again. In the short-circuit phase, there is a short-circuit between the workpiece and the welding wire, so that the delivery of material from the welding wire to the workpiece is assisted. With the interruption of the short-circuit after the delivery of material and the (re)ignition of the arc, the short-circuit phase is ended and the arc phase is initiated. During the arc phase, thermal energy is introduced into the welding wire and the workpiece.

In the state of the art, the melting welding wire is conveyed to the workpiece (arc phase) or away from it (short-circuit phase) according to a predetermined sequence at fixed predetermined speeds and for fixed predetermined times. This is known, for example, from EP 3 292 936 A1. In the short-circuit phase, the welding wire is brought to a final rearward speed, which is then reduced again in order to convey the welding wire at a final forward speed in the direction of the workpiece. The times at which the welding wire is conveyed at the final speeds in the respective phases are set in advance. The times of occurrence and interruption of the short-circuit are triggered.

Further welding methods are known from JP 2021 079427 A, EP 3 815 828 A1 and US 2018/0264576 A1.

In the case of short-circuit welding methods of the type described above, it often happens that the occurrences and the breaks of the short-circuits vary in time from welding cycle to welding cycle, so that the welding frequency is not constant. This leads to a reduction in the quality of the weld seam. In the case of many materials, for example viscous materials, such as chromium-nickel alloys or titanium, it can also happen that unwanted welding splashes occur during the delivery of material to the workpiece, which also adversely affects the welding frequency and the welding quality. Welding splashes are usually due to the welding wire speed being too high at the time of material delivery. If, on the other hand, the welding wire speed is too low, this unnecessarily slows down the welding frequency or the droplet delivery frequency and thus the welding method, and further irregularities in the short-circuit times can occur. Even at the point in time of the short-circuit, the welding wire speed should not be selected to be too high in order to avoid further irregularities in the welding frequency and undesirable effects, such as, for example, contact of the non-melted base material by the welding wire, vibrations of the welding bath and brief "sticking" of the welding wire. It would therefore be desirable to select the speed curve of the welding wire in such a way that the highest possible welding frequency and, above all, the most stable possible welding frequency is ensured and a high welding quality is obtained while welding splashes are avoided.

The ideal speeds and durations with which the welding wire is to be conveyed with the forward and rearward speeds in the respective phases for stabilising the welding frequency and for avoiding welding splashes depend, inter alia, on the weld seam shape, the temperature, impurities, the material of the workpiece and other parameters, and are, therefore, difficult to determine. It is therefore not easy in the state of the art to select or achieve the ideal time durations or speed profiles for a welding wire in a short-circuit welding method.

In view of these embodiments, it is therefore the object of the present invention to alleviate or even completely eliminate the drawbacks of the state of the art. It is preferably the object of the invention to keep the welding frequency of a short-circuit welding method as stable as possible in order to improve the welding quality.

This object is achieved by a short-circuit welding method according to claim 1 and by a welding device according to claim 14. Preferred embodiments are defined in dependent claims.

According to claim 1, therefore, in a short-circuit welding method of the above-mentioned type, it is therefore initially provided that the first duration of the first rearward conveying phase is adapted by means of a feedforward control and/or feedback control such that the welding wire in the second rearward conveying phase does not exceed a predetermined reduced rearward speed at the time of the interruption of the short-circuit. Preferably, the first duration is adapted by the feedforward control and/or feedback control in such a way that the welding wire in the second rearward conveying phase essentially has the predetermined reduced rearward speed at the point in time of interruption of the short-circuit. Advantageously, by adapting the first duration, the first rearward conveying phase and thus the conveying of the welding wire at the final rearward speed ends in good time before the interruption of the short-circuit, and the reduction of the rearward speed of the welding wire is started, so that the welding wire is not conveyed too quickly when the material is delivered to the workpiece, and thus welding splashes are avoided. The feedforward control and/or feedback control thus ensures that the rearward speed of the welding wire is reduced if it is too high. In other words, the feedforward control and/or feedback control ensures that the welding wire in the second rearward conveying phase is set to a lower rearward speed value at the point in time of interruption of the short-circuit, which does not exceed the predetermined reduced rearward speed value. As a result, the welding frequency is stabilised. The absolute amount of the predetermined reduced rearward speed is less than the absolute amount of the final rearward speed. The first duration of the first rearward conveying phase is variably adjustable and is adapted by the feedforward control and/or feedback control. The interruption of the short-circuit, as well as the generation of the short-circuit, are preferably detected by measuring the welding voltage. Typical values for the first duration are, for example, between 1 ms and 10 ms, preferably between 2 and 3 ms for values for the welding frequency between 5 Hz and 200 Hz, preferably between 80 Hz and 150 Hz. The adaptation of the first duration by the feedforward control and/or feedback control can take place from welding cycle to welding cycle or, in some embodiments of the invention, also within a welding cycle. By adapting the first duration, the first rearward conveying phase is shortened or lengthened. If, for example, it is determined that the welding wire is conveyed too quickly at the point of time of interruption of the short-circuit, the first duration of the first rearward conveying phase can be correspondingly shortened. If, for example, it is determined that the welding wire is conveyed too slowly at the point of time of interruption of the short-circuit, the first duration of the first rearward conveying phase can be correspondingly extended. The first rearward conveying phase begins at the time when the welding wire changes from a forward speed to a rearward speed. In the first rearward conveying phase, the welding wire is brought to the final rearward speed by acceleration. When the final rearward speed is reached, the acceleration of the welding wire can be stopped and the speed of the welding wire can be kept substantially constant. Preferably, a substantially constant acceleration takes place in the first rearward conveying phase. The first rearward conveying phase is immediately followed by the second rearward conveying phase, in which the rearward speed is reduced again by acceleration ("braking") of the welding wire (now in the opposite direction). By reduction of the rearward speed is meant a reduction of the absolute amount and thus a slowing down of the rearward movement of the welding wire. The interruption of the short-circuit preferably takes place in the second rearward conveying phase, wherein the feedforward control and/or feedback control ensures that the welding wire does not exceed the predetermined reduced rearward speed at the point in time of interruption of the short-circuit. It is preferred if the feedforward control and/or feedback control ensures that the welding wire corresponds to the predetermined reduced rearward speed at the point of time of interruption of the short-circuit. When the short-circuit is interrupted, the acceleration of the welding wire can be stopped for a holding duration. Subsequently, the acceleration can be continued in the second rearward conveying phase. The second rearward conveying phase can be followed by the first forward conveying phase, in which the welding wire is brought to a final forward speed. The first forward conveying phase is immediately followed by the second forward conveying phase, in which the forward speed is reduced again by acceleration of the welding wire. The second forward conveying phase is again followed by the first rearward conveying phase. A welding cycle accordingly consists of the first and the second rearward conveying phase as well as of the first and the second forward conveying phase in this order. The amount of the final rearward speed and/or the amount of the final forward speed can be, for example, between 10 m/min and 70 m/min, in particular between 20 m/min and 60 m/min. Forward speeds have a positive or no sign in this disclosure. Rearward speeds are provided with a negative sign for differentiation. The forward speeds and the rearward speeds are selected so that a forward speed in the direction of the workpiece results on average over a plurality of welding cycles. In other words, the integral is positive over the speed course over a plurality of welding cycles. This is necessary because the melting welding wire releases material to the workpiece to form a weld seam or a coating. Typical amounts for welding wire acceleration values are, for example, in the range between 30,000 m/min/s and 60,000 m/min/s. The welding wire is preferably conveyed by an electric motor, in particular a gearless direct drive.

In a preferred embodiment, it is provided that the second rearward conveying phase comprises a first intermediate plateau phase with a substantially constant rearward speed, wherein the welding wire in the first intermediate plateau phase is preferably conveyed away from the workpiece at the predetermined reduced rearward speed. The acceleration with which the rearward speed of the welding wire is reduced is interrupted by the intermediate plateau phase. The advantage of the first intermediate plateau phase is that the welding wire is conveyed during this time at a reduced and essentially constant rearward speed compared to the final rearward speed, and the material transfer to the workpiece can take place without acceleration, so that no welding splashes are caused. The rearward speed is substantially constant during the entire first intermediate plateau phase.

It is therefore preferred if the first duration is adapted by the feedforward control and/or feedback control in such a way that the interruption of the short-circuit takes place in the first intermediate plateau phase. After the interruption of the short-circuit, the acceleration of the welding wire can still be suspended for a certain holding duration before the acceleration of the welding wire is continued in the second rearward conveying phase. After the holding duration, the welding wire can be accelerated further until the welding wire is finally conveyed at a (final) forward speed.

In one embodiment of the invention, a control for adapting the first duration is provided, wherein the control is carried out by a control circuit with a controller, in particular a P or PI controller, wherein the control adapts the first duration so that the first intermediate plateau phase corresponds to a first target duration. It is preferred if a control variable of the control circuit is formed by the first duration and a reference variable of the control circuit is formed by the first target duration of the first intermediate plateau phase. The duration of the first intermediate plateau phase can serve as the measured control variable. The controller adapts the first duration in such a way that the interruption of the short-circuit takes place in the first intermediate plateau phase. The first target duration specifies how long the first intermediate plateau phase should last. The first target duration may be, for example, between 0.5 ms and 1.5 ms. A reference variable may also be referred to as a target variable for the control circuit. The controller adjusts the first duration from welding cycle to welding cycle. If there is a deviation between the first target duration and the effective duration of the first intermediate plateau phase, the first duration of the first rearward conveying phase is adapted in the next welding cycle. If the effective duration is the first intermediate plateau phase, the first duration of the first rearward conveying phase is shortened. If the effective duration of the first intermediate plateau phase is too long, the first duration of the first rearward conveying phase is extended. In order to avoid any vibrations, the control can preferably have parameterisable filters. A filter may define the maximum rate of change or the slew rate, for example. A filter can for example be formed by a PT1 element.

In an alternative embodiment, a control for adapting the first duration is provided, wherein the control is carried out by a control circuit having a controller, in particular a P or PI controller, wherein a control variable of the control circuit is formed by the first duration, a reference variable of the control circuit is formed by a target rearward speed of the welding wire, in particular the predetermined reduced rearward speed, and a measured control variable of the control circuit is formed by a measured rearward speed of the welding wire at the point in time of the interruption of the short-circuit. In the event of a deviation of the measured rearward speed of the welding wire from the target rearward speed at the point in time of interruption of the short-circuit, the first duration in the next welding cycle is adapted. Thus, if the welding wire has an excessively high or excessively low rearward speed at the point of time of interruption of the short-circuit, the first duration of the first rearward conveying phase is shortened or lengthened in the next welding cycle. The speed of the welding wire at the point of time of interruption of the short-circuit can be measured.

With regard to the control, it may be advantageous to add an offset value to the reference variable.

In a further alternative embodiment, a resistance value is continuously determined from a welding current and a welding voltage and a prediction is made about the time of interruption of the short-circuit from the resistance value, wherein the first duration is adapted on the basis of the prediction by starting with the second rearward conveying phase. The continuously determined resistance value allows conclusions to be drawn about the imminent interruption of the short-circuit. If the interruption of the short-circuit is imminent, the first rearward conveying phase is ended and the rearward conveying speed of the welding wire is reduced, so that the welding wire at the point of time of interruption of the short-circuit does not exceed the predetermined reduced rearward speed or substantially corresponds to it. It is preferably provided that the first rearward conveying phase is ended in good time in such a way that the interruption of the short-circuit takes place in the first intermediate plateau phase. Accordingly, in this embodiment, the adaptation of the first duration takes place within a welding cycle.

In order to be able to determine the instant of interruption of the short-circuit, it can be provided that the prediction is created on the basis of a predetermined resistance threshold value or on the basis of a resistance change rate. For example, the first rearward conveying phase can be ended when the continuously determined resistance value exceeds the predetermined resistance threshold value or the resistance change rate exceeds a predetermined resistance change rate threshold value.

A particularly efficient embodiment of the invention results if the first rearward conveying phase has a first final plateau phase, in which the welding wire is conveyed at a substantially constant final rearward speed and a duration of the first final plateau phase is adapted by the feedforward control and/or feedback control. The adaptation of the first duration of the rearward conveying phase takes place via the adaptation of the duration of the first final plateau phase.

The previous statements relate to the short-circuit phase of the short-circuit welding method. In order to increase the efficiency and stability of the welding method, in particular the welding frequency, the method steps described hitherto can be applied analogously to the arc phase and the generation of the short-circuit. In one embodiment, it is therefore provided that the second duration of the first forward conveying phase is adapted by means of a further feedforward control and/or feedback control in such a way that the welding wire in the second forward feed phase does not exceed a predetermined reduced forward speed at the time when the short-circuit occurs. By adapting the second duration, the first forward conveying phase is shortened or lengthened so that the welding wire in the second forward conveying phase does not exceed or substantially corresponds to the predetermined reduced forward speed at the point of time of interruption of the short-circuit. The second forward conveying phase immediately follows the first forward conveying phase. The predetermined reduced forward speed is smaller compared to the final forward speed. Preferably, the second forward conveying phase comprises a second intermediate plateau phase with a substantially constant forward speed, wherein the welding wire in the second intermediate plateau phase is preferably conveyed at the predetermined reduced forward speed. Furthermore, it is preferably provided that the second duration is adapted by the further feedforward control and/or feedback control in such a way that the generation of the short-circuit takes place in the first intermediate plateau phase.

The embodiments of the regulating and/or control system described above in connection with the short-circuit phase can be applied analogously to the arc phase.

In one embodiment of the invention, therefore, a further control for adapting the second duration is provided, wherein the further control is carried out by a further control circuit with a further controller, in particular a P or PI controller, wherein the further control adapts the second duration, so that the second intermediate plateau phase has a second target duration. It is preferred if a control variable of the further control circuit is formed by the second duration and a reference variable of the further control circuit is formed by the second target duration of the second intermediate plateau phase. The further controller adapts the second duration in such a way that the generation of the short-circuit takes place in the second intermediate plateau phase. The second target duration specifies how long the second intermediate plateau phase should last. The second target duration of the second intermediate plateau phase may be, for example, between 0.5 ms and 2 ms. A reference variable may also be referred to as a target variable for the control circuit. The further controller adapts the second duration from welding cycle to welding cycle. If there is a deviation between the second target duration and the effective duration of the second intermediate plateau phase, the second duration of the second forward conveying phase is adapted in the next welding cycle. In this embodiment, the second target duration is thus predetermined and the second duration is adapted such that the second intermediate plateau phase has the second target duration. If, for example, the effective duration of the second intermediate plateau phase is too short, the second duration of the first forward conveying phase is shortened. If, for example, the effective duration of the second intermediate plateau phase is too long, the second duration of the second forward conveying phase is extended.

In an alternative embodiment, a further control for adapting the second duration is provided, wherein the further control is carried out by a further control circuit having a further controller, in particular a P or PI controller, wherein a control variable of the further control circuit is formed by the second duration, a reference variable of the further control circuit is formed by a target forward speed of the welding wire, in particular the predetermined reduced forward speed, and a measured control variable of the further control circuit is formed by a measured forward speed of the welding wire at the time of the generation of the short-circuit. In the event of a deviation of the forward speed of the welding wire from the desired forward speed, the second duration is adapted in the next welding cycle. Thus, if the welding wire has an excessively high or excessively low forward speed at the time of generation of the short-circuit, the second duration of the second forward conveying phase is shortened or lengthened in the next welding cycle. The speed of the welding wire at the time of generation of the short-circuit can be measured.

With regard to the control, it may be advantageous to add an offset value to the reference variable.

A particularly efficient embodiment of the invention results if the first forward conveying phase has a second final plateau phase, in which the welding wire is conveyed at a substantially constant final forward speed and a duration of the second final plateau phase is adapted by the feedforward control and/or feedback control. The adaptation of the second duration of the forward conveying phase takes place via the adaptation of the duration of the second final plateau phase.

The object mentioned at the outset is also achieved by a welding device according to claim 14. The welding device is configured to perform a short-circuit welding method and comprises a welding torch. The welding device is designed to convey a melting welding wire away from a workpiece during the short-circuit phase at a rearward speed so that material is discharged from the welding wire to the workpiece and an arc is ignited, wherein the welding device is further designed to bring the welding wire to a final rearward speed during the short-circuit phase in a first rearward conveying phase with a first duration and to convey it with the final rearward speed until the onset of a second rearward conveying phase in which the rearward speed of the welding wire is reduced again, wherein the second rearward conveying phase immediately follows the end of the first rearward conveying phase, and the welding device is further designed to convey the welding wire in the direction of the workpiece during the arc phase at a forward speed in order to generate a short-circuit between the welding wire and the workpiece, wherein the welding device is further designed to bring the welding wire to a final forward speed during the arc phase in a first forward conveying phase with a second duration and to convey it with the final forward speed until the onset of a second forward conveying phase, in which the forward speed of the welding wire is reduced again, wherein the second forward conveying phase immediately follows the end of the first forward conveying phase, wherein a control and/or regulating unit is provided, which is designed to adapt the first duration of the first rearward conveying phase such that the welding wire in the second rearward conveying phase does not exceed a predetermined reduced rearward speed at the time of the interruption of the short-circuit.

With regard to the advantages and further features of the device, reference is made to the short-circuit welding method described above. The features described in connection with the short-circuit welding method can also be transferred to the welding device. The welding device may comprise a wire feed unit configured to convey the welding wire. The welding device can comprise an electric motor, in particular a gearless direct drive.

A further short-circuit welding method of the type described below is also disclosed. Accordingly, in a short-circuit welding method of the type mentioned at the outset, it is provided that the second duration of the first forward conveying phase is adapted by means of a further feedforward control and/or feedback control in such a way that the welding wire in the second forward conveying phase does not exceed a predetermined reduced forward speed at the time of the generation of the short-circuit. The method can be described as follows:

A short-circuit welding method with successive welding cycles, each of which having an arc phase and a short-circuit phase, with the following steps during a welding cycle:

conveying a melting welding wire away from a workpiece during the short-circuit phase at a rearward speed so that material is discharged from the welding wire to the workpiece and an arc is ignited, wherein the welding wire is brought to a final rearward speed during the short-circuit phase in a first rearward conveying phase with a first duration and is conveyed therewith until the beginning of a second rearward conveying phase in which the rearward speed of the welding wire is reduced again, conveying the welding wire in the direction of the workpiece during the arc phase at a forward speed in order to bring the welding wire into contact with the workpiece and to generate a short-circuit between the welding wire and the workpiece, wherein the welding wire is brought to a final forward speed during the arc phase in a first forward conveying phase with a second duration and is conveyed therewith until the beginning of a second forward conveying phase, in which the forward speed of the welding wire is reduced again, wherein the second duration of the first forward conveying phase is adapted by means of a further feedforward control and/or feedback control in such a way that the welding wire in the second forward conveying phase does not exceed a predetermined reduced forward speed at the time when the short-circuit occurs.

The feedforward control and/or feedback control thus ensures that the forward speed of the welding wire is reduced if it is too high. In other words, the feedforward control and/or feedback control ensures that the welding wire in the second forward conveying phase is set to a lower forward speed value at the time of generation of the short-circuit, which does not exceed the predetermined reduced forward speed value.

The additional feedforward control and/or feedback control has already been described in connection with the short-circuiting method according to claim 1. The above features and explanations also apply to the short-circuit method described herein.

Also disclosed is a further welding device of the type described below. The welding device is configured to perform the further short-circuit welding method and comprises a welding torch, the welding device being designed to convey a melting welding wire away from the workpiece during the short-circuit phase at a rearward speed so that material is discharged from the welding wire to the workpiece and an arc is ignited, wherein the welding device is further designed to bring the welding wire to a final rearward speed during the short-circuit phase in a first rearward conveying phase with a first duration and to convey it with the final rearward speed until the onset of a second rearward conveying phase in which the rearward speed of the welding wire is reduced again, and the welding device is further designed to convey a melting welding wire in the direction of a workpiece during the arc phase at a forward speed in order to generate a short-circuit between the welding wire and the workpiece, wherein the welding device is further designed to bring the welding wire to a final forward speed during the arc phase in a first forward conveying phase with a second duration and to convey it with the final forward speed until the onset of a second forward conveying phase, in which the forward speed of the welding wire is reduced again, wherein an additional control and/or regulating unit is provided, which is designed to adapt the second duration of the first forward conveying phase such that the welding wire in the second forward conveying phase does not exceed a predetermined reduced forward speed at the time of the generation of the short-circuit.

Figure 2:
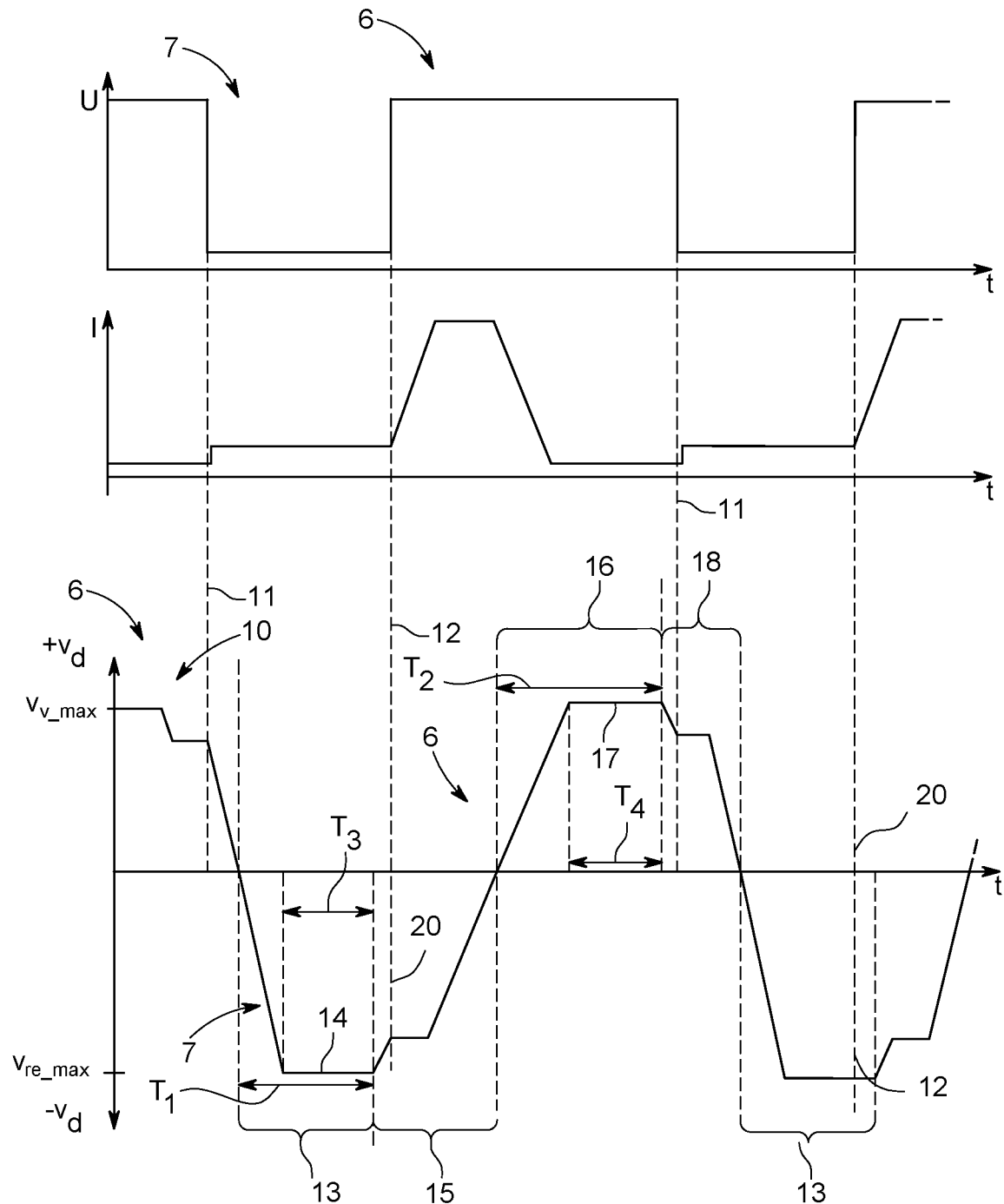
Figure 3:
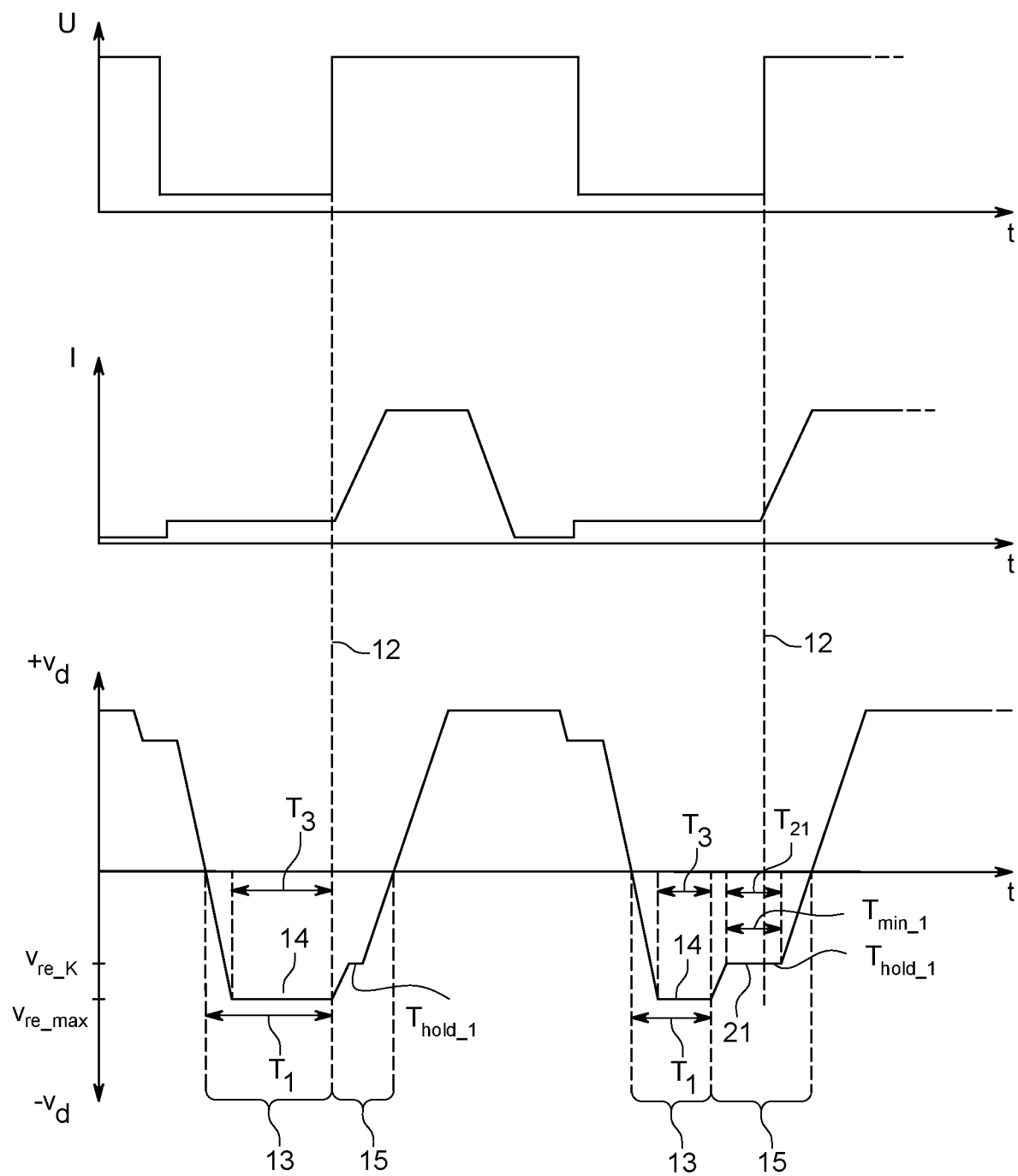
Figure 4A:
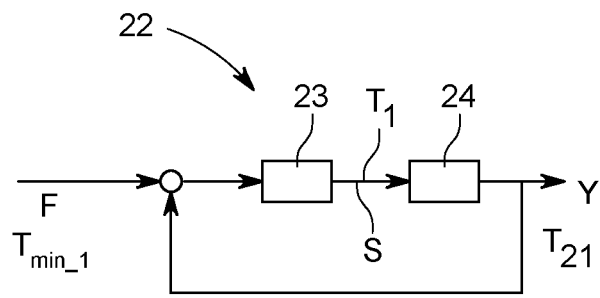
Figure 4B:
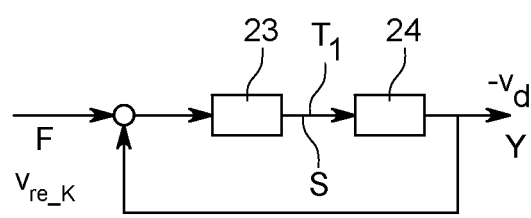
Figure 5:
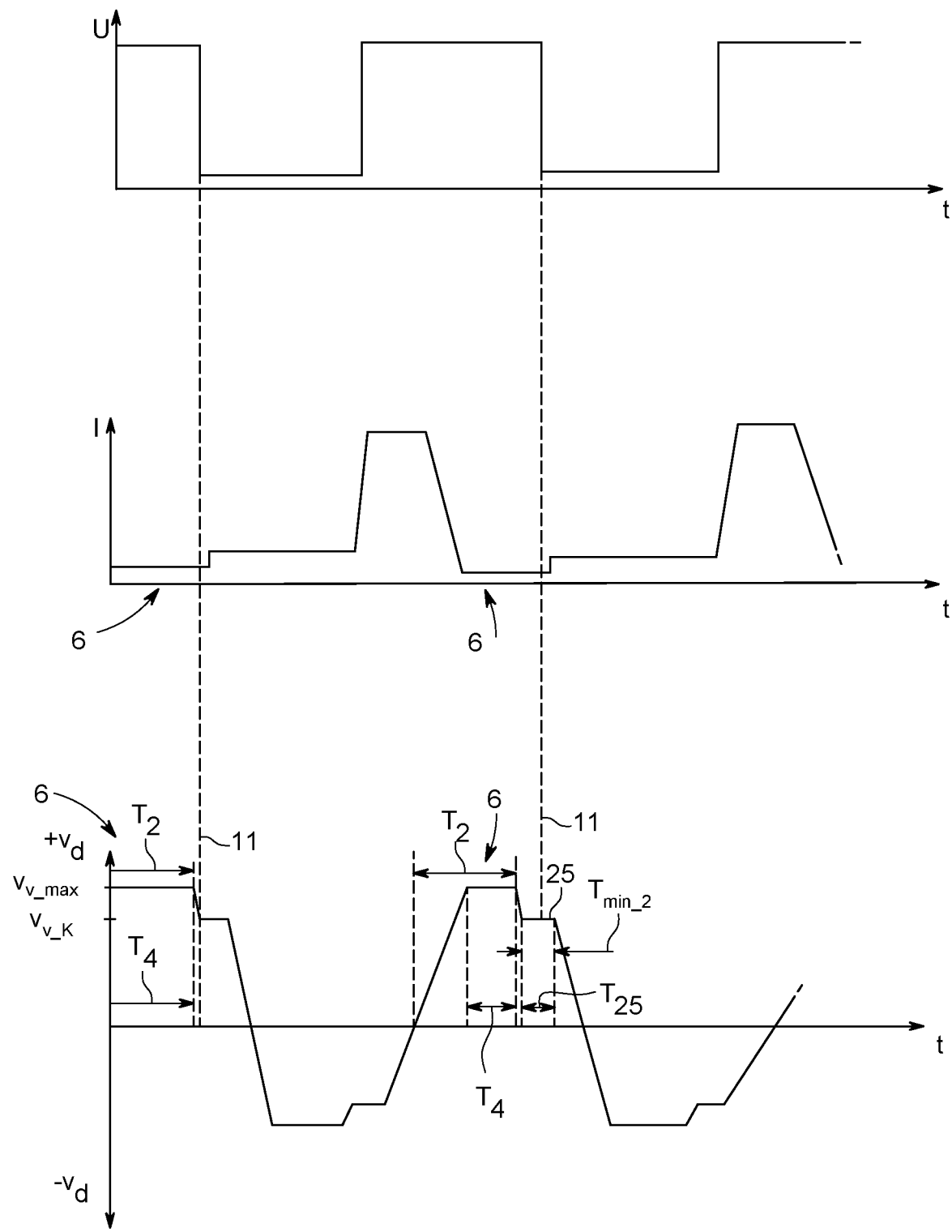
Figure 6A:
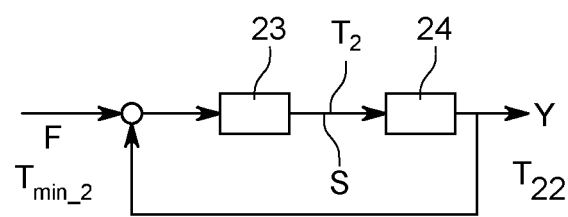
Figure 6B:
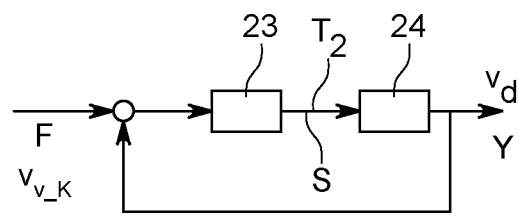

In the following, the invention will be explained in more detail with reference to figures, to which, however, it is not intended to be limited. They show in:

FIG. 1, a welding device for carrying out a short-circuit welding method;

FIG. 2, a welding voltage profile, a welding current profile and a speed profile of a welding wire in a short-circuit welding method from the state of the art;

FIG. 3, a welding voltage profile, a welding current profile and a speed profile of a welding wire in a short-circuit welding method according to the invention;

FIG. 4A and FIG. 4B, a control circuit;

FIG. 5, a welding voltage profile, a welding current profile and a further speed profile of a welding wire in a short-circuit welding method according to the invention;

FIG. 6A and FIG. 6B, a further control circuit; and

Figure 7:
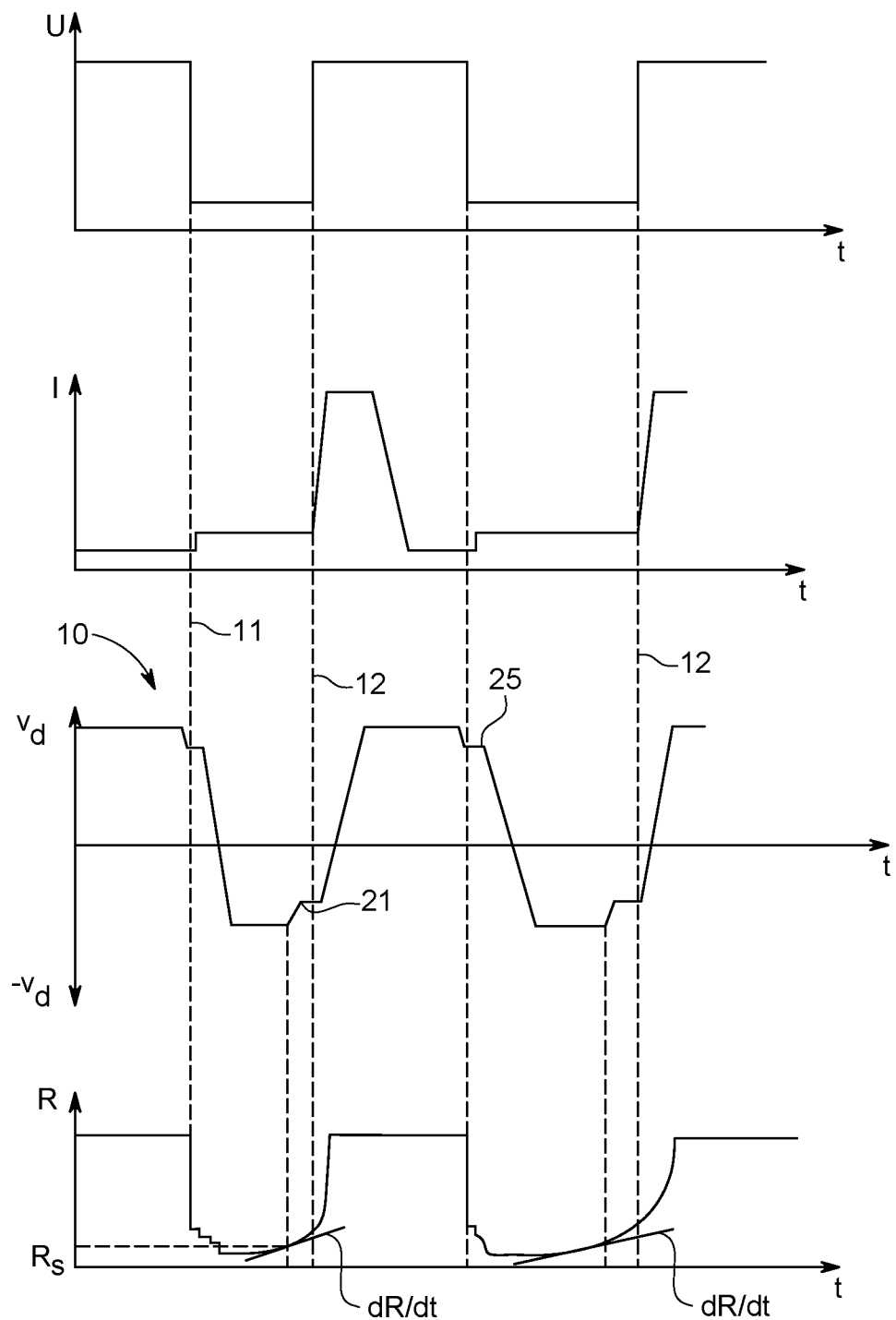

FIG. 7, a welding voltage profile, a welding current profile, a speed profile of a welding wire and a time profile of a resistance value.

FIG. 1 shows a welding device 1 with a welding torch 2, which is designed to carry out a short-circuit welding method, in particular a CMT welding method. In a short-circuit welding method, a melting welding wire 3 (electrode) is moved alternately in the direction of a workpiece 5 and back by a conveying device 4, which can have an electric motor. As a result of this sequence, a short-circuit welding method can be subdivided into arc phases 6 and short-circuit phases 7 (cf. for example FIGS. 2 and 3). The welding device 1 has a control/regulating unit 8 for controlling and/or regulating the welding wire 3. The welding wire 3 is guided by a supply drum 9 into the region of the welding torch 2.

FIG. 2 shows (below a time curve of a welding voltage U and a time curve of a welding current I) a velocity curve 10 of a welding wire 3 in a short-circuit welding method from the state of the art with fixed predetermined and preset time sequences. The speed $v_d$ is plotted on the ordinate, where $+v_d$ denotes a forward speed of the welding wire 3 in the direction of the workpiece 5 and $-v_d$ denotes a rearward speed of the welding wire 3 away from the workpiece 5. The short-circuit welding method can be divided into arc phases 6 and short-circuit phases 7. A short-circuit phase 7 begins with the generation 11 of the short-circuit between the welding wire 3 and the workpiece 5 when the welding wire 3 touches the workpiece 5. An arc phase 6 begins with the interruption 12 of the short-circuit between the welding wire 3 and the workpiece 5 and ends again with its generation. During the arc phase 6, the welding wire 3 is conveyed mainly in the direction of the workpiece 5 at a forward speed $+V_d$. During the short-circuit phase 7, the welding wire 3 is mainly conveyed away from the workpiece 5 at a rearward speed $-V_d$. A welding cycle consists of an arc phase 6 and a short-circuit phase 7.

The speed curve 10 of the welding wire 3 can be further subdivided into individual welding wire speed phases, with which the welding wire 3 is conveyed. In a first rearward conveying phase 13, the welding wire 3 is brought to a final rearward speed $v_{re\_max}$ by acceleration. The final rearward speed $v_{re\_max}$ can, for example, be in the range between 10 m/min and 60 m/min, in particular between 20 m/min and 60 m/min. The first rearward conveying phase 13 has a total duration, which is referred to as the first duration $T_1$ and which can be, for example, 3 ms. After the welding wire 3 has reached the final rearward speed $v_{re\_max}$, the acceleration is ended and the welding wire 3 is conveyed away from the workpiece 5 in a first final plateau phase 14 at substantially constant final rearward speed $v_{re\_max}$. The final plateau phase 14 has the duration $T_3$. Directly following the end of the first rearward conveying phase 13 is a second rearward conveying phase 15, in which the rearward speed $-v_d$ of the welding wire 3 is again reduced by acceleration. The rearward speed $-v_d$ is reduced to zero in this phase. Subsequently, a first forward conveying phase 16 is provided, in which the welding wire 3 is accelerated to a final forward speed $v_{v\_max}$. The total duration of the first forward conveying phase 16 is referred to as the second duration $T_2$. In a second final plateau phase 17, the duration of which is denoted by $T_4$, the final forward speed $v_{v\_max}$ is kept substantially constant. The first forward conveying phase 16 is immediately followed by a second forward conveying phase 18, in which the forward speed $+v_d$ is reduced again to zero. Subsequently, a first rearward conveying phase 13 is again provided. The speed curve shown is a schematic and idealised representation of a desired curve. The effective speed curves may differ physically from the curve shown.

At the end of the short-circuit phase 7, at the time of the interruption 12 of the short-circuit, a delivery of material (droplet delivery) from the welding wire 3 onto the workpiece 5 occurs to produce a weld seam 19 (see FIG. 1). However, the speed of the welding wire 3 is too high at the time of the interruption 12 of the short-circuit, as is the case in FIG. 2, so that welding splashes can arise, which adversely affect the quality of the weld seam 19. This is particularly the case with viscous materials such as titanium.

In the state of the art, the speed curve 10 is determined over fixedly predefined time durations $T_1$, $T_2$ or $T_3$, $T_4$. The first duration $T_1$ should be set in such a way that the welding wire 3 is conveyed sufficiently slowly at the time of the interruption 12 in order to avoid welding splashes. However, the time point of the interruption 12 of the short-circuit as well as the time point of the generation 11 of the short-circuit may vary, as shown in FIG. 2, and depend on parameters such as the material, the weld seam, impurities, and the temperature, etc. The selection of the fixed durations $T_1$ and $T_2$ or $T_3$, $T_4$ is therefore not entirely simple. For example, the case may occur in which the welding wire 3 is conveyed at an excessively high rearward conveying speed $-v_d$ at the point in time of the interruption 12 of the short-circuit and thus weld splashes are produced. This is shown in FIG. 2 where the-short-circuit is interrupted at the points in time 20 at too high a speed. The points in time 20 vary in time relative to the speed curve 10, as can also be seen in FIG. 2. The points in time of the generation 11 of the short-circuit can also vary. Due to the variation of the points in time of the generation 11 and interruption 12 of the short-circuit, the welding frequency is irregular and thus not stable.

According to the invention, it is therefore provided that the first duration $T_1$ of the first rearward conveying phase 13 is adapted by means of a feedforward control and/or feedback control in such a way that the welding wire 3 in the second rearward conveying phase 15 does not exceed, in particular does not correspond to, a predetermined reduced rearward speed $v_{re\_x}$ at the point of time of the occurrence 12 of the short-circuit. This is illustrated in FIG. 3 in the right short-circuit phase 7. The first rearward conveying phase 13 therefore ends in time compared to the left short-circuit phase 7, and the second rearward conveying phase 15 is initiated before the interruption 12 of the short-circuit takes place. The control and/or regulating operations can be implemented in the control and/or regulating unit 8.

The second rearward conveying phase 15 may have a first intermediate plateau phase 21 with a substantially constant rearward speed $-v_d$. In the first intermediate plateau phase 21, the welding wire 3 is preferably conveyed away from the workpiece 5 at the predetermined reduced rearward speed $v_{re\_K}$. The feedforward control and/or feedback control adjusts the first duration $T_1$ in the embodiment shown such that the interruption 12 of the short-circuit takes place in the first intermediate plateau phase 21.

This can be done within a welding cycle or from welding cycle to welding cycle. After the interruption 12 of the short-circuit, the predetermined reduced rearward speed $v_{re\_K}$ of the welding wire 3 is still held for a holding duration $T_{hold\_1}$ before the acceleration of the welding wire 3 is continued.

In FIG. 4A, a block diagram for a control system is shown.

The control system is formed by a closed control circuit 22 and is configured to adapt the first duration $T_1$, in the event of a deviation, from welding cycle to welding cycle, so that the welding wire 3 does not exceed a predetermined reduced rearward speed $v_{re\_K}$ in the subsequent welding cycle in the second rearward conveying phase 15 at the point in time of interruption 12 of the short-circuit. FIG. 3 shows an adjustment from welding cycle to welding cycle. In particular, the first duration $T_1$ can be adapted in such a way that the interruption 12 of the short-circuit takes place in the first intermediate plateau phase 21. The control circuit 22 contains a controller 23, which can be designed, for example, as a P or PI controller, and the controlled section 24. The first duration $T_1$ is provided in the control circuit 22 as the control variable S. This can be adjusted by the controller 23. The target or reference variable F of the control circuit 22 is formed by a first target duration $T_{min\_1}$ of the first intermediate plateau phase 21. The duration $T_{21}$ of the first intermediate plateau phase 21 is used as the measured control variable Y.

In FIG. 4B, an alternative embodiment of the control system is shown. The control variable S of the control circuit 22 is again used for the first duration $T_1$. This can be adjusted by the controller 23. However, the predetermined reduced rearward speed $v_{re\_K}$ of the welding wire 3, which the welding wire is to have at the time of interruption 12 of the short-circuit, is used as the target or reference variable F of the control circuit 22. The measured rearward speed $-v_d$ of the welding wire 3 at the point in time of interruption 12 of the short-circuit is used as the measured control variable Y. If the speed of the welding wire 3 at the point in time of interruption 12 of the short-circuit deviates from the predetermined reduced rearward speed $v_{re\_K}$, the controller 23 adjusts the first duration $T_1$ in the next welding cycle, so that the welding wire 3 is conveyed in the future at the predetermined reduced rearward speed $v_{re\_K}$ in the interruption 12 of the short-circuit. An adjustment from welding cycle to welding cycle is shown in FIG. 3. In particular, the first duration $T_1$ can be adapted in such a way that the interruption 12 of the short-circuit takes place in the first intermediate plateau phase 21.

Analogous to the short-circuit phase, an adaptation of the second duration $T_2$ of the first forward conveying phase 16 can be carried out by an additional feedforward control and/or feedback control in an additional control and/or regulating unit 8', so that the welding wire 3 does not exceed a predetermined reduced forward speed $v_{v\_K}$ in the second forward conveying phase 18 at the point in time of generation 11 of the short-circuit. This is illustrated in FIG. 5 in the right arc phase 6. The first forward conveying phase 16 therefore ends in good time and the second forward conveying phase 18 is initiated before the generation 11 of the short-circuit takes place. FIG. 5 also shows a welding current profile and a welding voltage profile.

Further controls are illustrated in FIGS. 6A and 6A.

In FIG. 6A, a block diagram for an additional control system is shown. The additional control system is formed by a closed control circuit 22' and is designed to adapt the second $T_2$, if necessary, from welding cycle to welding cycle, so that the welding wire 3 does not exceed a predetermined reduced forward speed $v_{v\_K}$ in the subsequent welding cycle in the second rearward conveying phase 18 at the point in time of generation 11 of the short-circuit. This is shown in FIG. 5. In particular, the first duration $T_2$ can be adapted in such a way that the generation 11 of the short-circuit takes place in a second intermediate plateau phase 25 at a constant predetermined reduced forward speed $v_{v\_K}$. The control circuit 22' contains a controller 23, which can be designed, for example, as a P or PI controller, and the controlled section 24'. As control variable S, the additional control circuit 22' uses the second duration $T_2$. This can be adjusted by the additional controller 23'. The target or reference variable F of the additional control circuit 22' is formed by a second target duration $T_{min\_2}$ of the second intermediate plateau phase 25. The duration $T_{25}$ of the second intermediate plateau phase 25 is used as the measured control variable R.

In FIG. 6B, an alternative embodiment of an additional control circuit 22' is shown. The control variable S of the additional control circuit 22' is again used for the second duration $T_2$. This can be adjusted by the additional controller 23'. However, the predetermined reduced forward speed $v_{v\_K}$ of the welding wire 3, which the welding wire is to have at the point in time of generation 11 of the short-circuit, is used as the target or reference variable F of the additional control circuit 22'. The measured forward speed $v_d$ of the welding wire 3 at the point in time of generation 11 of the short-circuit is used as the measured control variable Y. If the speed of the welding wire 3 at the point in time of generation 11 of the short-circuit deviates from the predetermined reduced forward speed $v_{v\_K}$, the additional controller 23' adjusts the second duration $T_2$ in the next welding cycle, so that the welding wire 3 is conveyed in the future at the predetermined reduced forward speed $v_{v\_K}$ in the generation 11 of the short-circuit. An adjustment from welding cycle to welding cycle is shown in FIG. 5. In particular, the second duration $T_2$ can be adapted in such a way that the generation 11 of the short-circuit takes place in the second intermediate plateau phase 25.

FIG. 7 shows, below a velocity curve 10, a welding voltage curve, and a welding current curve, a time curve of a resistance value R on the basis of which the interruption 12 of the short-circuit can be predicted. The resistance value is calculated from the welding voltage U and from the welding current I. Based on the prediction, the first duration $T_1$ can be adjusted. This can be done within one cycle. The adjustment of the first duration $T_1$ can be carried out by a control system. For example, if the resistance value exceeds a resistance threshold $R_s$ or the resistance change rate dR/dt exceeds a predetermined resistance change rate threshold, the imminent interruption 12 of the short-circuit may be determined. Subsequently, the control system may terminate the first rearward conveying phase 13 and initiate the second rearward conveying phase 15. In this manner, the first time duration $T_1$ is adjusted.

The invention claimed is:

1. A short-circuit welding method with successive welding cycles, each of which having an arc phase (6) and a short-circuit phase (7), with the following steps during a welding cycle:
    conveying a melting welding wire (3) away from a workpiece (5) during the short-circuit phase (7) at a rearward speed ($-v_d$) so that material is discharged from the welding wire (3) to the workpiece (5) and an arc is ignited, wherein the welding wire (3) is brought to a final rearward speed ($v_{re\_max}$) during the short-circuit phase (7) in a first rearward conveying phase (13) with a first duration ($T_1$) and is conveyed therewith until the beginning of a second rearward conveying phase (15) in which the rearward speed ($-v_d$) of the welding wire (3) is reduced again, wherein the second rearward conveying phase (15) immediately follows the end of the first rearward conveying phase (13); and
    conveying the welding wire (3) in the direction of the workpiece (5) during the arc phase (6) at a forward speed ($v_d$) in order to bring the welding wire (3) into contact with the workpiece (5) and to generate a short-circuit between the welding wire (3) and the workpiece (5), wherein the welding wire (3) is brought to a final forward speed ($v_{v\_max}$) during the arc phase (6) in a first forward conveying phase (16) with a second duration ($T_2$) and is conveyed therewith until the beginning of a second forward conveying phase (18), in which the forward speed ($v_d$) of the welding wire (3) is reduced again, wherein the second forward conveying phase (18) immediately follows the end of the first forward conveying phase (16),
    wherein
    the first duration ($T_1$) of the first rearward conveying phase (13) is adjusted by means of feedforward control and/or feedback control in such a way that the welding wire (3) in the second rearward conveying phase (15) does not exceed a predetermined reduced rearward speed ($v_{re\_K}$) at the point in time of interruption (12) of the short-circuit, wherein the first rearward conveying phase (13) is shortened or lengthened by adjusting the first duration ($T_1$), wherein the absolute amount of the predetermined reduced rearward speed ($v_{re\_K}$) is less than the absolute amount of the final rearward speed ($v_{re\_max}$).

2. The short-circuit welding method according to claim 1, wherein the second rearward conveying phase (15) comprises a first intermediate plateau phase (21) with a substantially constant rearward speed ($-v_d$), wherein the welding wire (3) in the first intermediate plateau phase (21) is preferably conveyed away from the workpiece (5) at the predetermined reduced rearward speed ($v_{re\_K}$).

3. The short-circuit welding method according to claim 2, wherein the first duration ($T_1$) is adapted by the feedforward control and/or feedback control in such a way that the interruption (12) of the short-circuit takes place in the first intermediate plateau phase (21).

4. The short-circuit welding method according to claim 3, wherein a feedback control for adapting the first duration ($T_1$) is provided, wherein the feedback control is carried out by a control circuit (22) with a controller (23), in particular a P or PI controller, wherein the feedback control adapts the first duration ($T_1$) so that the first intermediate plateau phase (21) corresponds to a first target duration ($T_{min\_1}$).

5. The short-circuit welding method according to claim 1, wherein a feedback control for adapting the first duration ($T_1$) is provided, wherein the feedback control is carried out by a control circuit (22) having a controller (23), in particular a P or PI controller, wherein a control variable (S) of the control circuit (22) is formed by the first duration ($T_1$), a reference variable (F) of the control circuit (22) is formed by a target rearward speed of the welding wire (3), in particular the predetermined reduced rearward speed ($v_{re\_K}$), and a measured control variable (Y) of the control circuit (22) is formed by a measured rearward speed ($-v_d$) of the welding wire (3) at the point in time of the interruption (12) of the short-circuit.

6. The short-circuit welding method according to claim 1, wherein a resistance value (R) is continuously determined from a welding current (1) and a welding voltage (U) and a prediction is made about the point in time of interruption (12) of the short-circuit from the resistance value (R), wherein the first duration ($T_1$) is adapted on the basis of the prediction by starting with the second rearward conveying phase (15).

7. The short-circuit welding method according to claim 6, wherein the prediction is generated on the basis of a predetermined resistance threshold value ($R_s$) or on the basis of a resistance change rate (dR/dt).

8. The short-circuit welding method according to claim 1, wherein the first rearward conveying phase (13) has a first final plateau phase (14), in which the welding wire (3) is conveyed at a substantially constant final rearward speed ($v_{re\_max}$) and a duration ($T_3$) of the first final plateau phase (14) is adapted by the feedforward control and/or feedback control.

9. The short-circuit welding method according to claim 1, wherein the second duration ($T_2$) of the first forward conveying phase (16) is adjusted by means of an additional feedforward control and/or feedback control in such a way that the welding wire (3) in the second forward conveying phase (18) does not exceed a predetermined reduced forward speed ($v_{v\_K}$) at the point in time of generation (11) of the short-circuit, wherein the first forward conveying phase (16) is shortened or lengthened by adjusting the second duration ($T_2$).

10. The short-circuit welding method according to claim 9, that wherein the second forward conveying phase (18) comprises a second intermediate plateau phase (25) with a substantially constant forward speed ($v_d$), wherein the welding wire (3) in the second intermediate plateau phase (25) is preferably conveyed away from the workpiece (5) at the predetermined reduced forward speed ($v_{v\_A}$).

11. The short-circuit welding method according to claim 10, wherein the second duration ($T_2$) is adapted by the additional feedforward control and/or feedback control in such a way that the generation (11) of the short-circuit takes place in the second intermediate plateau phase (25).

12. The short-circuit welding method according to claim 11, wherein an additional feedback control for adapting the second duration ($T_2$) is provided, wherein the additional feedback control is carried out by an additional control circuit (22') with an additional controller (23'), in particular a P or PI controller, wherein the additional feedback control adapts the second duration ($T_2$) so that the second intermediate plateau phase (25) corresponds to a second target duration ($T_{min\_2}$).

13. The short-circuit welding method according to claim 9, wherein an additional feedback control for adapting the second duration ($T_2$) is provided, wherein the additional feedback control is carried out by an additional control circuit (22') with an additional controller (23'), in particular a P or PI controller, wherein a control variable (S) of the additional control circuit (22') is formed by the second duration ($T_2$), a reference variable (F) of the additional control circuit (22') is formed by a target forward speed of the welding wire (3), in particular the predetermined reduced forward speed ($v_{v\_K}$), and a measured control variable (Y) of the additional control circuit (22') is formed by a measured forward speed ($v_d$) of the welding wire (3) at the point in time of the generation (11) of the short-circuit.

14. A welding device (1) for carrying out the short-circuit welding method according to a claim 1 with successive welding cycles, each comprising an arc phase (6) and a short-circuit phase (7), comprising a welding torch (2), a feedforward control and/or feedback control unit (8) and a conveying device (4) for conveying a melting welding wire (3), wherein the welding apparatus (1) is configured to convey the melting welding wire (3) away from the workpiece (5) during the short-circuit phase (7) at a rearward speed ($-v_d$) so that material is discharged from the welding wire (3) to the workpiece (5) and an arc is ignited, wherein the welding device (1) is further configured to bring the welding wire (3) to a final rearward speed ($v_{re\_max}$) during the short-circuit phase (7) in a first rearward conveying phase (13) with a first duration ($T_1$) and to convey it therewith until the beginning of a second rearward conveying phase (15) in which the rearward speed ($-v_d$) of the welding wire (3) is reduced again, wherein the second rearward conveying phase (15) immediately follows the end of the first rearward conveying phase (13), and the welding device (1) is further configured to convey the welding wire (3) in the direction of the workpiece (5) during the arc phase (6) at a forward speed ($v_d$) in order to generate a short-circuit between the welding wire (3) and the workpiece (5), wherein the welding device (1) is further configured to bring the welding wire (3) to a final forward speed ($v_{v\_max}$) during the arc phase (6) in a first forward conveying phase (16) with a second duration ($T_2$) and to convey it with the final forward speed ($v_{v\_max}$) until the beginning of a second forward conveying phase (18), in which the forward speed ($v_d$) of the welding wire (3) is reduced again, wherein the second forward conveying phase (18) immediately follows the end of the first forward conveying phase (16), wherein the feedforward control and/or feedback control unit (8) is configured so that the first duration ($T_1$) of the first rearward conveying phase (13) is adjusted by means of feedforward and/or feedback control in such a way that the welding wire (3) in the second rearward conveying phase (15) does not exceed a predetermined reduced rearward speed ($v_{re\_K}$) at the point in time of interruption (12) of the short-circuit, wherein the first rearward conveying phase (13) is shortened or lengthened by adjusting the first duration ($T_1$), wherein the absolute amount of the predetermined reduced rearward speed ($v_{re\_K}$) is less than the absolute amount of the final rearward speed ($v_{re\_max}$).

* * * * *

UNITED STATES PATENT AND TRADEMARK OFFICE
CERTIFICATE OF CORRECTION

PATENT NO. : 11,992,904 B1
APPLICATION NO. : 18/283566
DATED : May 28, 2024
INVENTOR(S) : Andreas Waldhoer et al.

It is certified that error appears in the above-identified patent and that said Letters Patent is hereby corrected as shown below:

In the Claims

In Column 15, Line 5 (Line 2 of Claim 10): please delete "that";

In Column 15, Line 40 (Line 2 of Claim 14): please delete "a".

Signed and Sealed this
Twenty-ninth Day of October, 2024

Katherine Kelly Vidal
*Director of the United States Patent and Trademark Office*